(12) United States Patent
Buch et al.

(10) Patent No.: US 9,626,989 B1
(45) Date of Patent: Apr. 18, 2017

(54) SELECTIVE POWERING TECHNIQUES FOR HEAT ASSISTED MAGNETIC RECORDING

(71) Applicant: Seagate Technology LLC, Cupertino, CA (US)

(72) Inventors: Bruce Buch, Westborough, MA (US); Wenzhong Zhu, Apple Valley, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 59 days.

(21) Appl. No.: 14/861,369

(22) Filed: Sep. 22, 2015

(51) Int. Cl.
*G11B 5/012* (2006.01)
*G11B 5/00* (2006.01)

(52) U.S. Cl.
CPC ...... *G11B 5/012* (2013.01); *G11B 2005/0021* (2013.01); *G11B 2220/252* (2013.01)

(58) Field of Classification Search
None
See application file for complete search history.

(56) References Cited

U.S. PATENT DOCUMENTS

| 7,876,517 | B2 | 1/2011 | Buch et al. | |
|---|---|---|---|---|
| 7,889,450 | B2 | 2/2011 | Vikramaditya et al. | |
| 8,867,158 | B2 | 10/2014 | Shaver et al. | |
| 2010/0118428 | A1* | 5/2010 | Buch | B82Y 10/00 360/51 |
| 2011/0205861 | A1* | 8/2011 | Erden | G11B 5/02 369/13.27 |
| 2014/0029396 | A1* | 1/2014 | Rausch | G11B 13/04 369/13.23 |

* cited by examiner

*Primary Examiner* — Brian Butcher
(74) *Attorney, Agent, or Firm* — Holzer Patel Drennan

(57) ABSTRACT

A heat-assisted magnetic recording (HAMR) device includes transducer head comprising a heat source and a writer. The HAMR device further includes a power controller configured to selectively power on and off the heat source independent of current flowing through a write coil of the writer based on a position of the transducer head relative to an adjacent rotating media.

17 Claims, 6 Drawing Sheets

SELECTIVE POWERING TECHNIQUES FOR HEAT ASSISTED MAGNETIC RECORDING

BACKGROUND

Thermally assisted magnetic recording or heat assisted magnetic recording (HAMR) generally refers to the concept of locally heating a recording medium to reduce the coercivity of the medium. Such reduced coercivity allows the applied magnetic writing fields to more easily direct the magnetization within the recording medium during the temporary magnetic softening caused by the heat source.

In HAMR, information bits are recorded on a data storage medium at elevated temperatures, and the data bit dimension can be determined by the dimensions of the heated area in the storage medium or the dimensions of an area of the storage medium that is subjected to a magnetic field. In one approach, a beam of light is condensed to a small optical spot onto the storage medium to heat a portion of the medium and reduce the magnetic coercivity of the heated portion. In some implementations, a single switch controls power to the beam of light and also to a write coil of a write element.

BRIEF DESCRIPTIONS OF THE DRAWINGS

SUMMARY

Implementations disclosed herein provide for a heat-assisted magnetic recording (HAMR) device including a power controller configured to selectively power on and off a heat source independent of a write coil in a transducer head, wherein the selective powering is based on a relative alignment between the transducer head and a position of interest on a rotating storage media.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
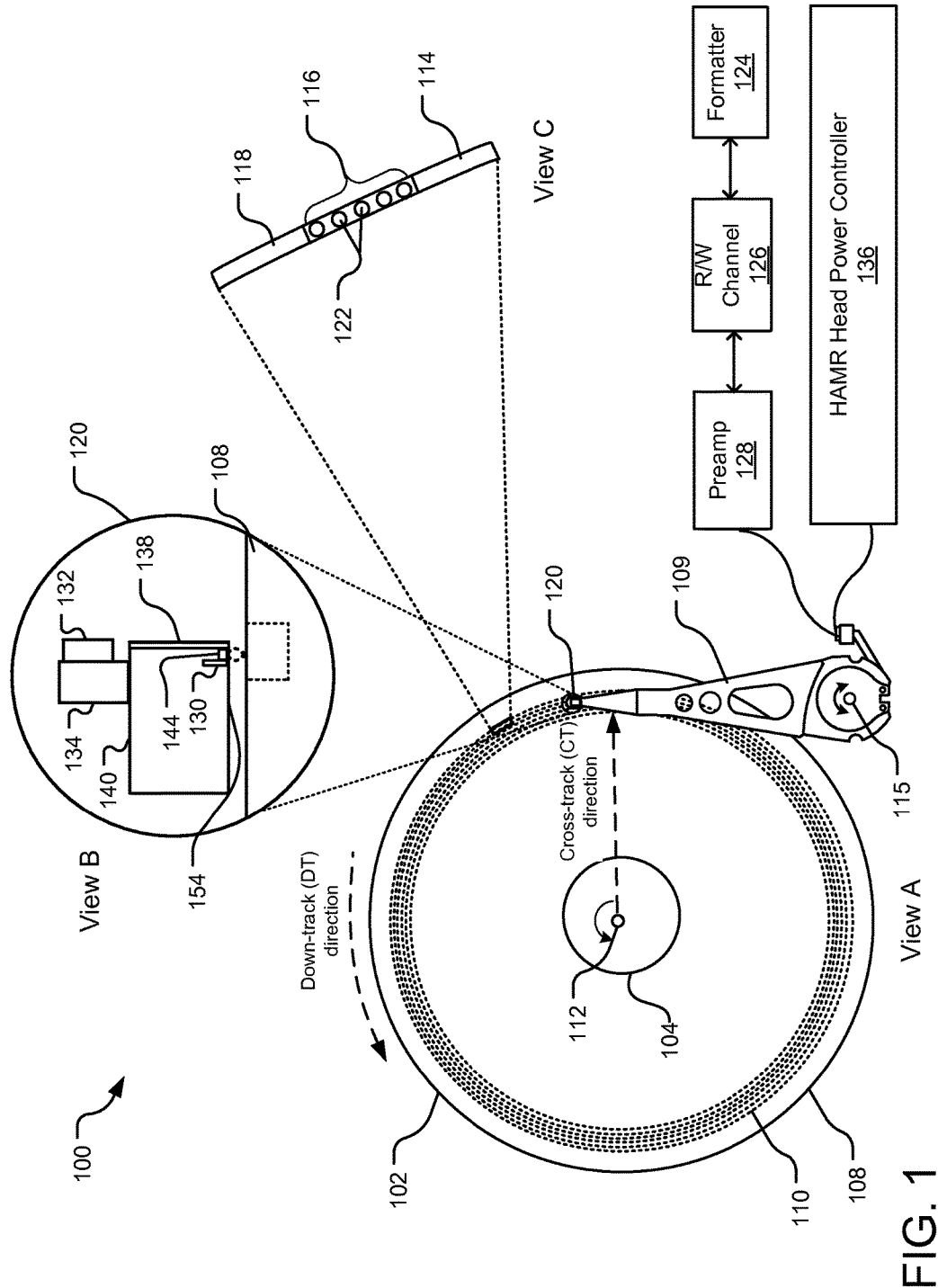
FIG. 1 illustrates an example data storage device including a transducer head assembly for writing data on a magnetic storage medium.

FIG. 1 illustrates an example data storage device 100 including a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (e.g., a writer 130) and from which data bits can be read using a magnetoresistive element (not shown). As illustrated in View A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the magnetic storage medium 108.

The transducer head assembly 120 is mounted on an actuator assembly 109 at an end distal to an actuator axis of rotation 115. The transducer head assembly 120 flies in close proximity above the surface of the magnetic storage medium 108 during disc rotation. The actuator assembly 109 rotates during a seek operation about the actuator axis of rotation 115 The seek operation positions the transducer head assembly 120 over a target data track for read and write operations.

In one implementation employing heat-assisted magnetic recording (HAMR), magnetic grains on the magnetic storage medium 108 are temporarily heated during the recording process to selectively lower magnetic coercivity in a tightly focused area of the storage medium 108 that substantially corresponds to an individual data bit. The heated region is then encoded with the recorded data bit based on the polarity of an applied magnetic write field. After cooling, the magnetic coercivity substantially returns to its pre-heating level, thereby stabilizing the magnetization for that data bit. This write process is repeated for multiple data bits on the magnetic storage medium 108, and such data bits can be read using a magneto-resistive read head.

Referring to View B, the transducer head assembly 120 includes, among other features, a heat source 132 (e.g., a laser) coupled to a submount assembly 134. Light from the heat source 132 is directed into a waveguide 138 mounted to a slider 140. Light exiting the waveguide is focused, via a Near Field Transducer (NFT) 144, and applied to a bit location on the magnetic storage medium 108 as the bit location is subjected to a magnetic pulse generated by the writer 130. As an air-bearing surface 154 of the slider 140 "flies" across the surface of the storage medium 108, the writer 130 selectively magnetizes the underlying magnetic grains of the storage medium 108.

Different regions of each data track (e.g., data track 110s) on the storage media 108 are classified as servo sectors or data wedges. For example, expanded view C illustrates a data wedge 116 sandwiched between two servo sectors 114 and 118. The servo sectors 114, 118 are used by components of the storage device 100 to obtain position information such as a track number corresponding to a data track that the transducer head assembly 120 is currently tracking, the circumferential position of the transducer head assembly 120 relative to that track, fine positioning information that is used to keep the transducer head assembly 120 on that track, etc. In contrast, with servo sectors, data wedges include data sectors for storing user data and various formatting fields for storing other information, such as information used for timing synchronization of the transducer head assembly 120 when writing data.

Although other types of media may be suitable for implementing the disclosed technology, the storage medium 108 is a bit-patterned media (BPM) constructed with areas of magnetic material (referred to as "dots" or "islands"), such as dots 122, isolated from one another at fixed, predefined locations by regions of non-magnetic material.

To write data to the storage media 108, a formatter 124 receives data on a bus (not shown). The data can be from a system or host using the storage device 100, or can originate from within the storage device 100. The formatter 124 formats the data for each data wedge (e.g., the data wedge 116), then sends the formatted data to a read/write (R/W) channel 126. The R/W channel 126 encodes the formatted data for storage on the storage media 108. The R/W channel 126 is synchronized with the dots on a data track currently aligned with the transducer head assembly 120 so that the R/W channel 126 can timely provide the encoded, formatted data to a preamplifier ("preamp") 128. The preamp 128 transmits the signal represented by the encoded, formatted data to the transducer head assembly 120, and the writer 130 of the transducer head assembly 120 then interacts with a data track to write the encoded, formatted data. Reading of data from a data track is processed in reverse of the manner described.

In HAMR devices, such as the data storage device 100, an effective device lifetime may be limited by the total, cumulative wear on the transducer head assembly 120 by the heat source 132 of the transducer head assembly 120. Usage of the heat source 132 also significantly contributes to total power consumption of the data storage device 100. Therefore, there exist incentives to reduce the power consumption of the heat source 132. Implementations disclosed herein reduce the total power consumption of the data storage device 100 by operating the data storage device 100 such that the power state of the heat source is in an off-state as much as possible.

To achieve the aforementioned, the data storage device 100 includes circuitry for selectively routing current (AC or DC) through a write coil of the writer 130 independent of a power state of the heat source 132. If, for example, the heat source 132 is kept in a low power or "off" state while write current is flowed through the write coil, the magnetic pulses generated by the write coil do not affect a magnetization of dots 122 passing below the writer 130 on the rotating magnetic storage media 108. As explored with respect to the following figures, there are a number of circumstances when this selective powering is provided, such as during calibrations and during the reading of timing synchronization and positioning information embedded on the magnetic storage media 108. To achieve this selective powering, the data storage device 100 includes a HAMR head power controller 136 that selectively powers on and off the heat source 132 independent of current that flows to the write coil of the writer 130. In one implementation, this selective powering is executed based on the position of the transducer head assembly 120 relative to different formatting fields on the storage media 108 rotating below the transducer head assembly 120. Specific examples and advantages of this functionality are discussed with respect to the following figures.

Specific examples of the herein disclosed selective powering technology generally relate to BPM; however, these techniques may be equally applicable to non-BPM HAMR technologies.

In various implementations, aspects of the preamplifier 128, R/W channel 126, formatter 124, and the HAMR head power controller 136 may be embodied in software and/or hardware in a tangible computer-readable storage media. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store data. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

As used herein, "powering" or "providing power" refers to the provision of current to a component that allows the component to continuously perform an operational function without interruption. "Powering off" refers to a decrease or stoppage in current flow to the component that prevents the component from performing the operational function. In contrast, "powering on" refers to an increase in current flow to the component sufficient to allow the component to regain ability to perform the operational function. "Powering" the writer 130 may also be described herein as "exciting" the writer 130.

Figure 2:
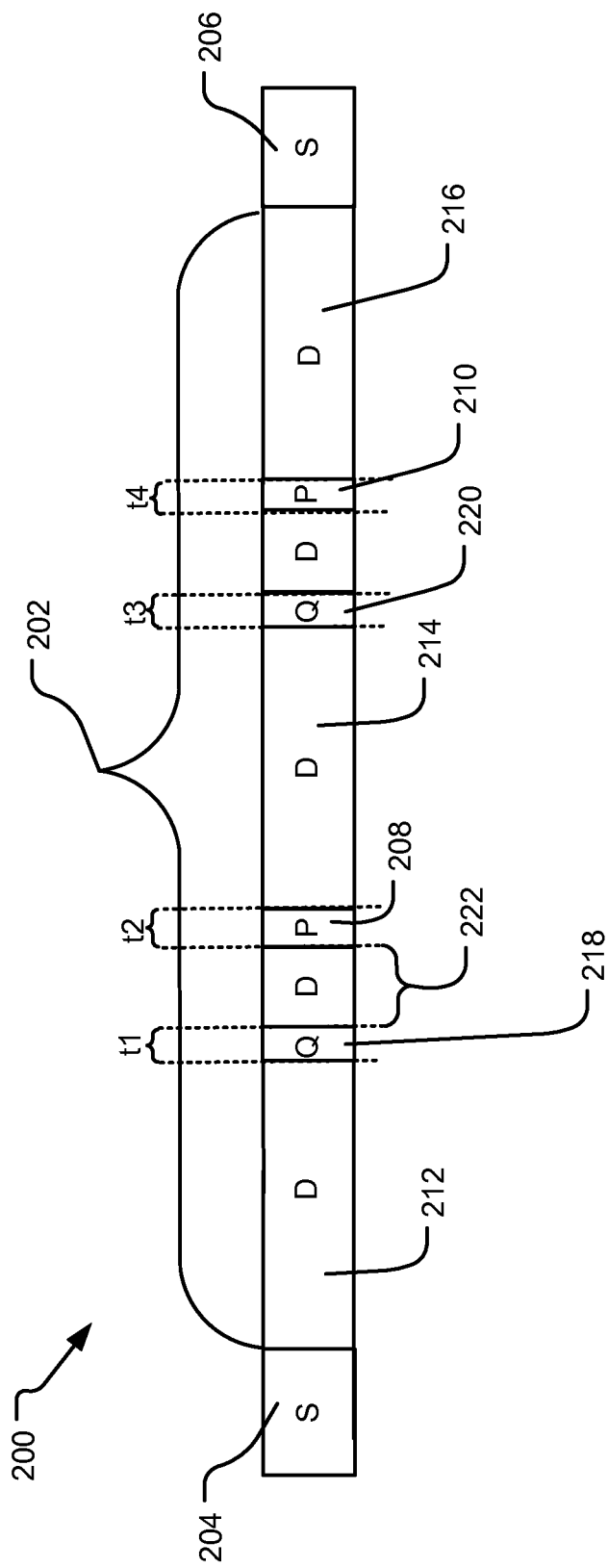
FIG. 2 illustrates an example data track of a bit patterned media (BPM) including a number of formatting fields corresponding to time intervals when a heat source of a HAMR head can be selectively powered off.

FIG. 2 illustrates example formatting fields of a data track of a BPM 200 suitable for implementation in a HAMR storage device with controls for selective independent powering of a heat source and a write coil. The illustrated portion of the BPM 200 includes a data wedge 202 between two servo sectors 204 and 206. The data wedge 202 includes a number of magnetically isolated regions (e.g., dots, not shown) used for various purposes. Data regions 212, 214, and 216 include dots used for storing user data, while iPLL (interspersed phase locked loop) fields or "P-Fields" 208, 210 include dots magnetized according to exhibit burst patterns used for timing synchronization, and are also referred to herein as "timing synchronization fields." In one implementation, P-fields, such as P-fields 208 and 210, are positioned on the data wedge 202 at regular intervals. Dots embedded in the P-fields may have a different physical pattern (e.g., frequency) than the dots embedded in other portions of the data wedge 202, such as in the data portions 212, 214, and 216. Circuitry in the storage system (e.g., a read/write channel) uses the P-fields 208, 210 to obtain phase and frequency clock synchronization with the dots on the BPM 200. In one implementation, iPLL fields are magnetically unipolar and include dots magnetized in a same direction. In another implementation, iPLL fields are magnetically bipolar.

In various implementations, the data wedge 202 may include other data fields (including different types of fields) in lieu of or in addition to those illustrated in FIG. 2.

During write operations, the P-fields 208, 210, are read to obtain timing phase information to feed back into a data phase-locked loop (PLL) of the channel. While the reader (not shown) of a transducer head is reading the P-fields 208, 210, a writer of the transducer head is "quiet." The writer is either not energized or is provided a DC field to avoid inducing noise into the reader or read signal. This mode of operation creates 'Q-fields' (quiet fields') 218 and 220 on the media proximal to each P-field other than the field immediately following a servo sector, creating P-Field/Q-Field pairs (e.g., a P-Field/Q-Field pair 218 and 208). A spacing 222 between each P-Field and Q-field of a P-field/Q-field pair is the result of a corresponding down-track separation between a reader and a writer on a transducer head of the storage device that includes the BPM 200. Since the writer trails the reader in the transducer head, the writer is therefore aligned with a Q-field whenever the reader is aligned with a P-field. The spacing 222 between each Q-field and P-field of a Q-field/P-field pair varies at different radial positions on the BPM 200 to match an effective down-track reader/writer separation at each cross-track position.

In one implementation, the BPM 200 is included in a storage device with circuitry for selective and independent powering of a heat source of the transducer head (e.g., the HAMR heat source) and also a write coil of the writer. For example, the storage device includes a HAMR head power controller that powers off the heat source whenever the writer of the transducer head is aligned with a Q-field on the BPM 200, as indicated by time intervals 't1' and 't3' in FIG. 2. Each of the time intervals t1, t3 further corresponds to a time that a reader of the transducer head is aligned with and reading a corresponding P-field (e.g., 208 and 210, respectively). In the same or another implementation, the HAMR head power controller selectively powers off the heat source when the writer of the transducer head is aligned with a P-field on the media, as indicated by example time intervals 't2' and 't4' in FIG. 2.

At times when the writer is aligned with data track areas shown corresponding to each of the time intervals t1, t2, t3, and t4, the heat source is powered off, but current may still flow through the write coil of the writer. This current flow through the writer could be AC or DC, but—as mentioned above, it may be desirable for noise mitigation to flow DC current through the writer when the writer is aligned with Q-Fields (e.g., when the reader is reading a corresponding P-Field).

So long as BPM 200 is not heated locally by the heat source, current running through the write coil has no effect on the magnetization of various dots on the BPM 200 passing below the transducer head. Consequently, this selective powering off of the heat source over certain data fields (e.g., Q-Fields and P-fields of the BPM 200) effectively reduces total power consumption and extends the lifetime of the heat source.

In an implementation that includes a conventional magnetic media that is not a BPM, the above-described selective powering techniques may also be useful. For example, the HAMR heat source may be powered off independent of current to the write coil when the writer is aligned with a servo sector on the non-BPM magnetic media.

Figure 3:
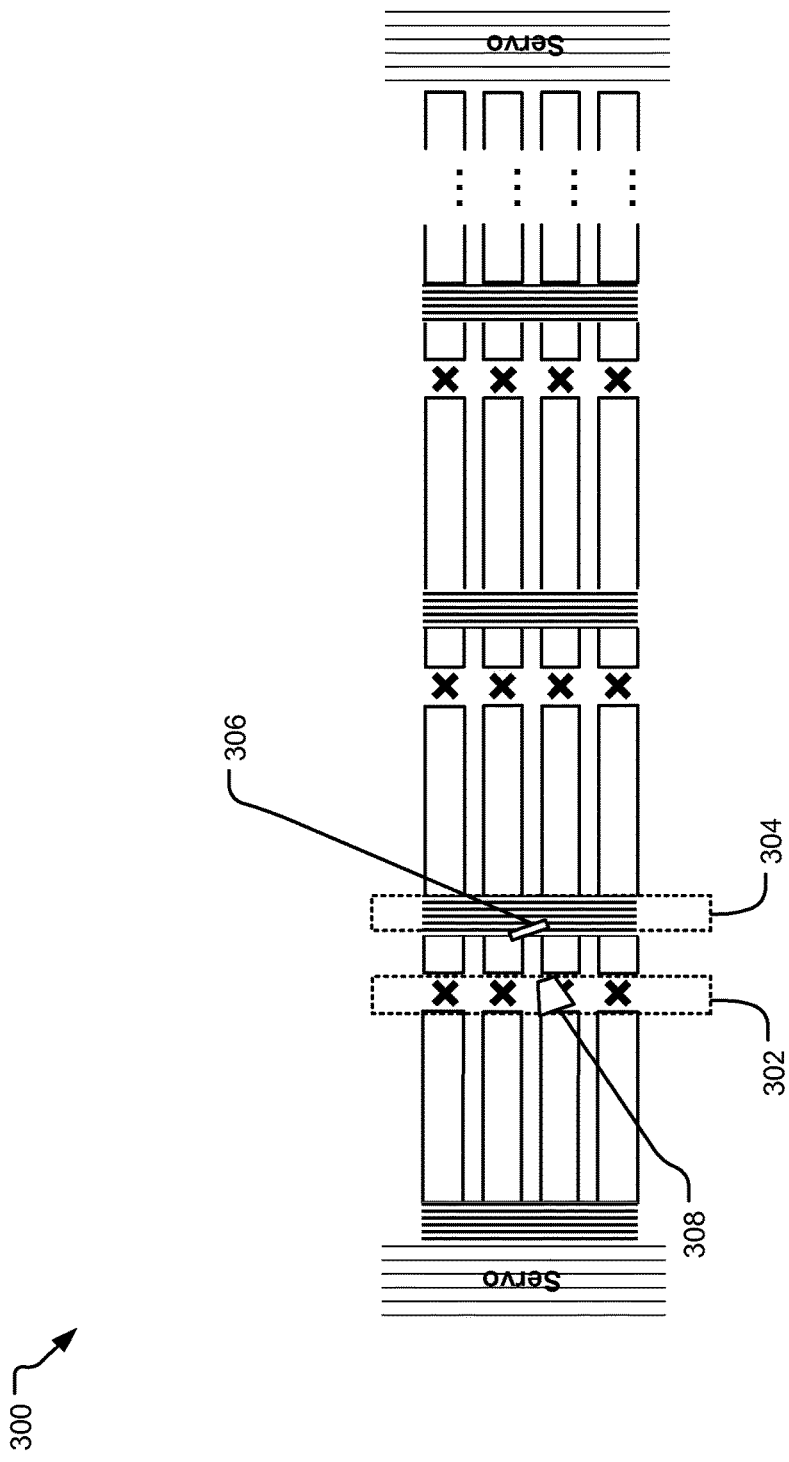
FIG. 3 illustrates an example view of another BPM including quiet fields and interspersed phase-locked loop (iPLL) fields corresponding to time intervals when a heat source of a HAMR head can be selectively powered off.

FIG. 3 illustrates a view of another BPM 300 including Q-fields (e.g., a grouping of Q-fields 302) and P-fields (e.g., a grouping of P-fields 304) corresponding to time intervals when a heat source of a HAMR head can be selectively powered off. Positions of an example reader 306 and writer 308 are shown relative to the BPM 300. The reader 306 is positioned proximal to a leading edge of the HAMR head and the writer 308 trails the reader when passing over data bits on the BPM 300. When the reader 306 is positioned over a P-field in the grouping of P-fields 304 spanning different data tracks, the writer 308 is positioned over a corresponding quiet field in the grouping of quiet fields 302. To mitigate noise interference when reading of each P-field, DC current is flowed through a write coil of the writer 308 for the duration of time that each Q-field is aligned with the writer 308 during rotation of the BPM 300.

Since meaningful data is not written during this time of writer/Q-field alignment, the heat source of the HAMR head is, in one implementation, powered off while the writer passes over each Q-field (e.g., the grouping of quiet fields 302). This conserves power and can reduce wear on the heat source over time. For the same reasons, the heat source can also be powered off when the writer is positioned over a P-field. In some implementations, both the current to the heat source and the write current (e.g., to the write coil) are switched off when the writer is aligned with a P-field. In other implementations, the write current is on and the heat source current is off when the write is aligned with a P-field.

Figure 4:
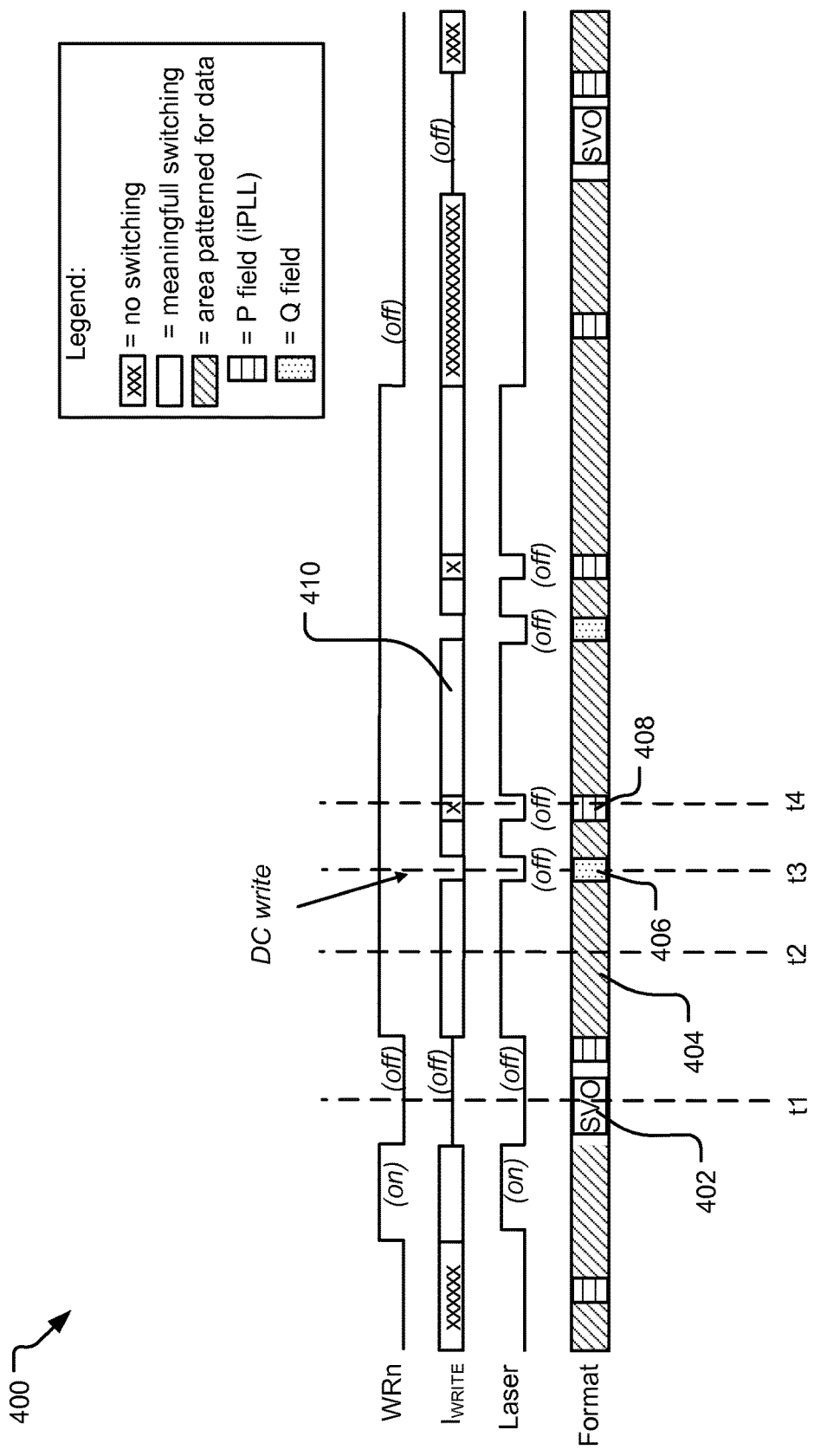
FIG. 4 illustrates an example time diagram showing various power and data states of a HAMR storage device as a BPM spins relative to a writer positioned on a transducer head.

FIG. 4 illustrates a time diagram 400 showing various power and data states of a HAMR storage device as a BPM spins relative to a writer positioned on a transducer head. A bottom row of the time diagram 400, labeled "format" indicates a relative alignment between the writer and different fields on the BPM at different points in time. For example, the writer is aligned with a servo sector 402 at a time t1, aligned with a data region 404 at a time t2, aligned with a Q-field 406 at a time t3, and aligned with a P-field 408 at a time t4.

A second row of the time diagram 400 labeled 'Laser' indicates a power state of a laser (e.g., a heat source) of a HAMR head over the time interval. At the times t1, t3, and t4, the laser is off. At the time t2, the laser is on.

An 'on/off' state of write current (e.g., either AC or DC signal provided to the write coil) is indicated by a top row of the time diagram, labeled "WRn," which refers to a preamplifier input signal that turns on and off the write current. The 'on' state of WRn indicates that either AC or DC signal is provided to the write coil. The 'off state' of WRn indicates that no current is provided to the write coil.

As indicated by the various power states on the time diagram 400, the HAMR storage device includes circuitry for powering the laser independent of current flow to a write coil of the write element. Notably, the write current and laser are both 'off' at time t1, while the write current is on and the laser is off at each of times t3, and t4.

A second-highest row of the time diagram 400 labeled '$I_{write}$' indicates current driven to the writer as an AC signal, DC signal, or no signal at all. In HAMR devices, the magnetic dots on the BPM cannot be switched in magnetic polarity when the heat source (e.g., laser) is off. Rather, data is written to the BPM exclusively when the laser current is on and when $I_{write}$ is non-zero (AC or DC). In the $I_{write}$ row, the notation "xxx . . . " is used to denote times when the laser is off to indicate areas of the media where the magnetic polarity of dots cannot be affected, regardless of whether AC, DC, or no current is flowed through the write coil. The state of WRn may vary considerably (e.g., off, AC, or DC) in different implementations for these regions denoted by "xxx . . . " For example, the write current could be either on or off when the writer is aligned with the P-field at time t4. If the writer is on at this time, it does not matter whether the write current is AC or DC because the laser is off. Therefore, information stored in the P-field cannot be incidentally overwritten.

In contrast to the "xxx . . . " regions, the $I_{write}$ notation "off" indicates that both the writer current and laser are off. Unfilled regions of the $I_{write}$ row (e.g., an unfilled region 410) indicate areas where magnetic switching of the dots occurs due to the combined state of WRn and the laser.

In one implementation, write current is switched from AC to DC whenever the write element is aligned with a Q-Field (e.g., the Q-field 406), such as at time t3. Use of DC rather than AC in such regions has been shown to help mitigate noise induced into a signal simultaneously read from a P-field of the BPM.

Powering the laser off during times of alignment between the writer and both P-fields and Q-fields (as shown) reduces total power consumption of the HAMR storage device and can increase the effective lifetime of the laser. In experimental studies, this selective depowering of the laser over P-fields and Q-fields has been shown to reduce write power-on hours (wPOH) by 2-4%. Selective powering of the laser independent of write current can also be, in some instances, effective to improve data storage efficiency on the BPM. One example selective powering scenario resulting in improved user data capacity is disclosed with respect to FIGS. 5A-5B, below.

Figure 5:
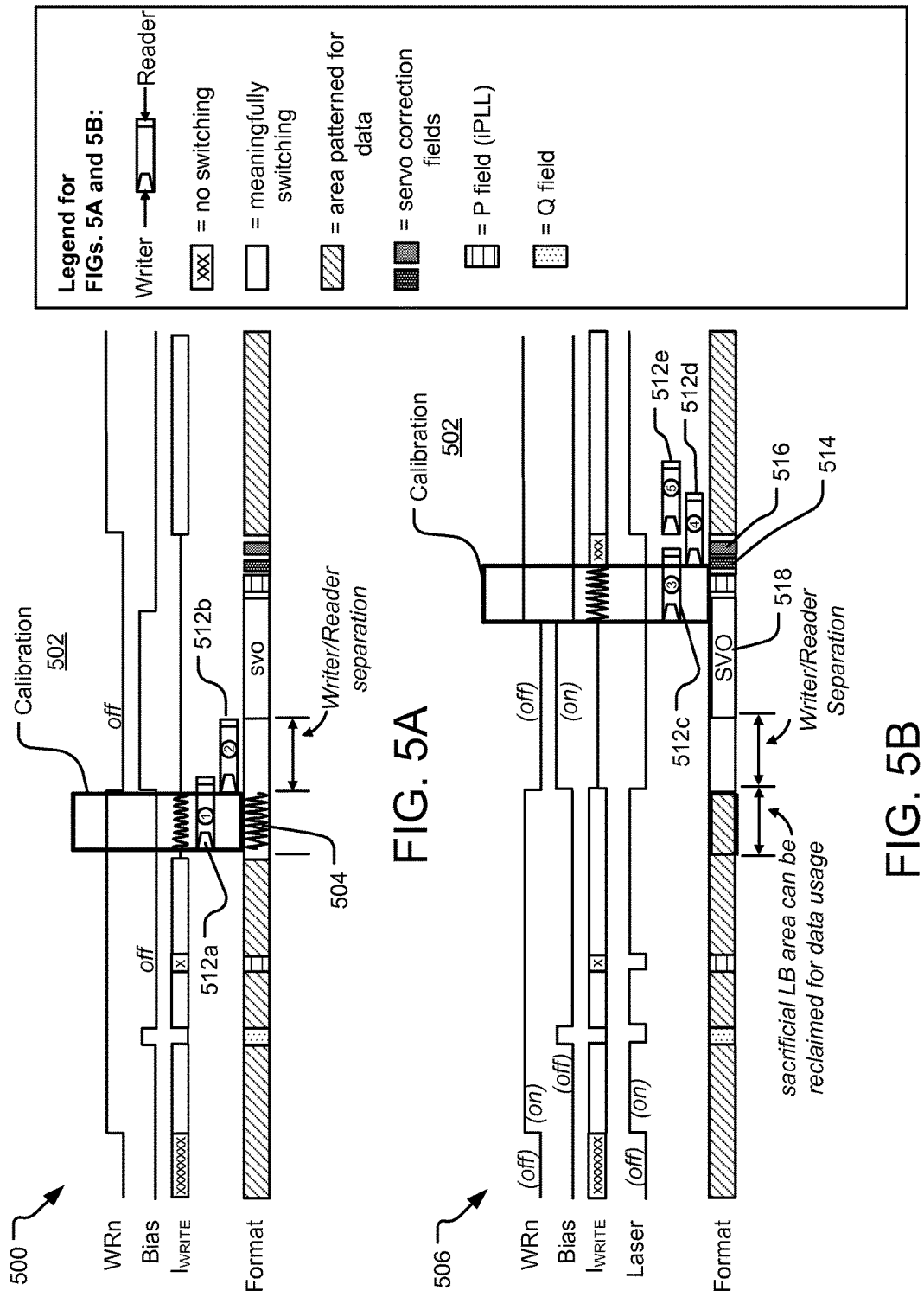
FIG. 5A illustrates an example time and state diagram indicating various data and power states of a storage device proximal in time to a calibration that excites a writer.
FIG. 5B illustrates another example time and state diagram indicating various data and power states of another storage device proximal in time to a calibration that excites a writer.

FIG. 5A illustrates a time and state diagram 500 indicating various data and power states of a storage device during a time interval including a calibration 502. The calibration 502 excites a waveform in the writer but does not entail meaningful writing of data to the BPM.

In one implementation, the calibration 502 is a loopback calibration that executes when the storage device is in a "write mode." One purpose of the loopback calibration is to enable precise timing of a write clock to temporally match each write transition of the writer to a corresponding target "dot" on the BPM rotating below the writer. For example, the loopback calibration may measure electrical path latencies to keep a target phase updated as the latency changes. Electrical path delay varies with a fairly short-time constant; for example, the electrical path may shift as write operations commence and a driver self-heats. A loopback calibration is also referred to herein as a timing synchronization calibration. An example transducer head is shown at a first position 512a corresponding to a start time of the calibration 502 and at a second position 512b corresponding to an end time of the calibration 502.

Providing context for the calibration 502, the time diagram 500 includes a number of rows indicating different information about states of BPM. A "format" row indicates a relative alignment between the writer and various formatting fields on the BPM at different points in time. A "WRn" row indicates an on/off state of a signal to a preamp that turns on and off write current. If the storage device is a HAMR device and the write current and a heat source (e.g., a laser) are jointly controlled by a single switch, the WRn may represent a power state of both the write current and the heat source.

A "bias" row (second from top) indicates an on/off state of a signal that turns on current to enable reading of a reader on the transducer head. Although having reader bias on does not interfere with writing, the head can be stressed if the bias signal is on when data is written to the BPM. Therefore, the bias signal is turned off (e.g., completely off or down to a low current level whenever data is written to the BPM).

A third-highest row of the time diagram 500 labeled '$I_{write}$' indicates current driven to the writer as an AC signal, DC signal, or no signal at all. As illustrated, excitation of the writer during the calibration 502 incidentally writes non-meaningful data to a sacrificial area 504 on the BPM.

FIG. 5B illustrates another time and state diagram 506 indicating various data and power states of another storage device during a time interval including a calibration that excites a writer. The storage device is a HAMR storage device that includes circuitry for independent and selective powering of a heat source and writer. Due to this independent and selective powering capability, it becomes feasible to perform the calibration 502 at a different time than that described in FIG. 5A. Consequently, additional space is conserved on a BPM for storage of user data as compared to configuration of FIG. 5A.

The time and state diagram 506 includes a number of rows indicating different information about states of BPM. A "format" row indicates a relative alignment between the writer and various formatting fields on the BPM at different points in time, while a "bias" row indicates an on/off state of a signal that turns on current to enable reading of a reader on the transducer head, and a "WRn" row indicates an on/off state of a signal to a preamp that turns on and off write current. Since the write current and heat source (e.g., laser) are independently controlled by different switches in FIG. 5B, a separate row labeled "Laser" indicates an on/off state of the heat source.

If the laser is "off," dots on the BPM are not magnetically switched during the calibration 502 regardless of the state of the writer (e.g., as represented by WRn). Therefore, unlike the implementation of FIG. 5A, there is no "sacrificial data area" reserved for the calibration 502. Since the calibration 502 does not affect dots on the media, the calibration 502 can be performed at a different time, such as when the writer is aligned with servo information (e.g., positioning information). This reserves more total space on the BPM for storage of user data.

Although specifics may vary from one implementation to another, the example calibration 502 commences during a write mode of the HAMR storage device when the reader finishes reading a first servo correction field 514 used for fine-positioning correction during writing (e.g., when a transducer head corresponds to a position 512c). A second servo correction field 516 is used for fine-positioning correcting during reading and is not used when the storage device operates in the write mode.

An example position 512d indicates a position of the transducer head time when the calibration 502 finishes and another example position 512e indicates a position of the transducer head at a time when a next data write begins. Notably, the servo sector 518 and the first servo correction field 514 are magnetically unaffected after passing below the transducer head during the calibration 502.

Figure 6:
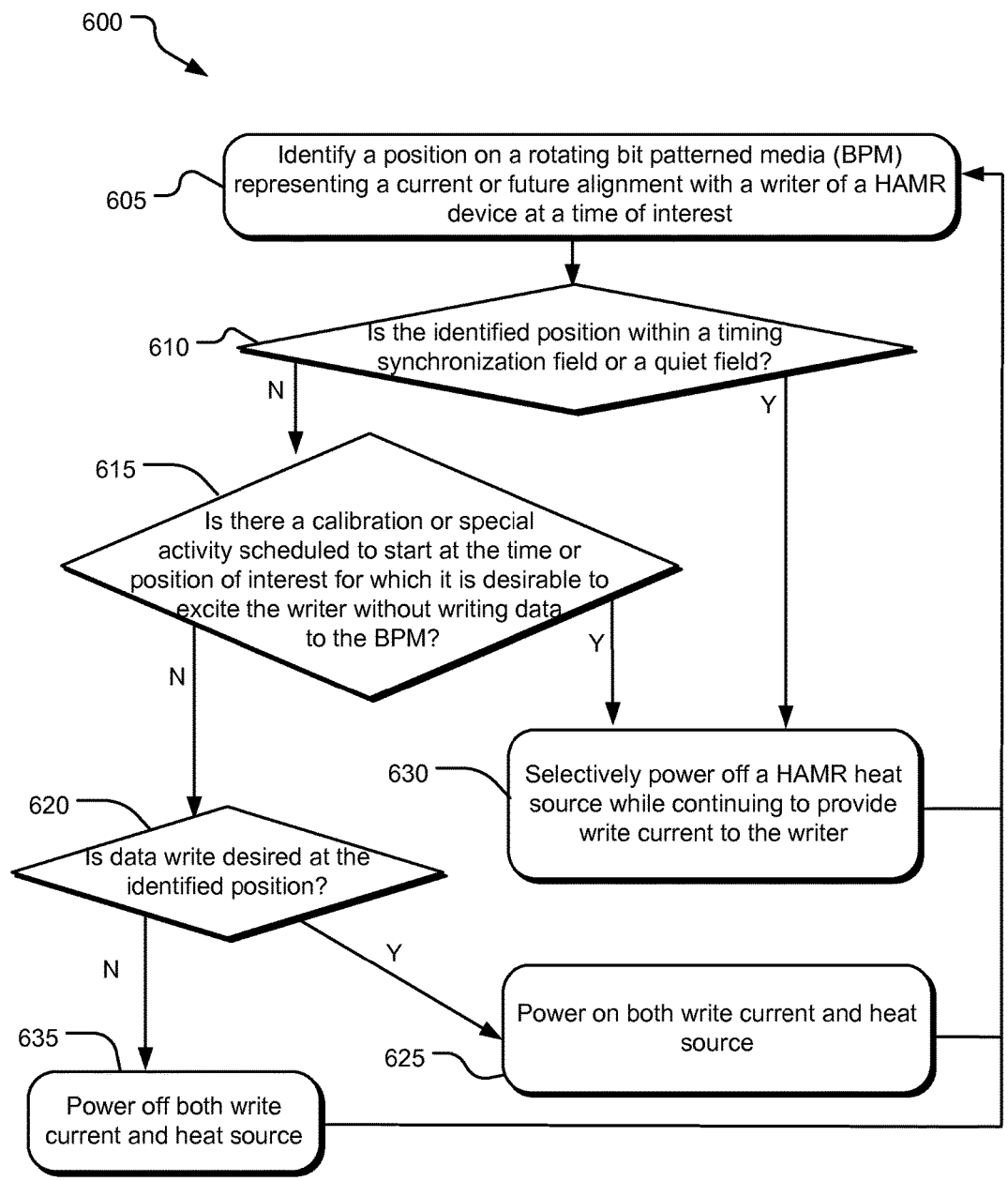
FIG. 6 illustrates a series of example operations for selective and independent powering of a write coil and a heat source in a HAMR device.

FIG. 6 illustrates a series of example operations 600 for selective and independent powering of a write coil and a heat source in a HAMR device. An identification operation 605 identifies a position of interest on a rotating BPM representing a current or future alignment with a writer of a HAMR device at a time of interest. In one implementation, the position of interest is a position of the writer relative to the media and the time of interest is the current time. In other implementations, the time of interest is a future time and the position of interest is a position that the writer is to assume relative to the media at the future time, such as in the next clock cycles or known number of clock cycles.

A determination operation 610 determines whether the identified position of interest is included within a timing synchronization field or a Q-field on the BPM. If the position of interest is included in either of a timing synchronization field or a Q-field, a selective powering operation 630 selectively powers off a HAMR heat source of the transducer head (e.g., a laser for localized heating). The selective powering operation 630 also powers on or continues to provide power to the writer (e.g., to provide write current to the writer). If, for example, the region of interest is a Q-field, the selective powering operation 630 provides a DC current to the writer. In another different implementation, the selective powering operation 630 provides an AC current to the writer when the HAMR heat source is powered off.

If the position of interest is not included in the timing synchronization field or a Q-field, another determination operation 615 determines whether there is a calibration or other special activity scheduled to start at the identified time of interest or the position of interest. If so, the determination operation 615 further determines whether the calibration or special activity is one for which it is desirable to excite the writer (e.g., provide write current to the write coil) without writing data to the BPM. If it is desirable to excite the writer but not write data, the selective powering operation 630 selectively powers off the HAMR heat source while powering on or continuing to power the writer.

If there is no special activity or calibration at the time of interest for which it is desirable to excite the writer without writing data, yet another determination operation 620 determines whether a data write is desired (e.g., scheduled to start) at the position or time of interest. If the determination operation 620 determines that a data write is desired at the position or time of interest, a powering operation 625 powers on or continues to provide write current to the write coil and also powers on or continues to power the heat source, thereby enabling a data write to the BPM. If, however, the determination operation 620 determines that no data write is desired, another powering operation 635 powers off both the write current to the write coil and heat source.

The identification operation 605 continues to identify additional positions of interest on the BPM, altering power states of the heat source and/or writer as indicated by repeated loops through operations 610 though 635.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A heat-assisted magnetic recording (HAMR) storage device comprising:
a power controller configured to selectively power on and off a heat source independent of a write coil in a transducer head and based on a relative alignment between the transducer head and a position of interest on a rotating storage medium, wherein selectively powering off the heat source entails stopping a flow of current to the heat source while allowing current to flow through the write coil.

2. The HAMR storage device of claim 1, wherein the power controller is further configured to flow direct current (DC) through the write coil while the heat source is powered off.

3. The HAMR storage device of claim 1, wherein the power controller is further configured to flow alternating current (AC) through the write coil while the heat source is powered off.

4. The HAMR storage device of claim 1, wherein the power controller is further configured to perform a calibration during a write mode of a storage device while the heat source is powered off.

5. The HAMR storage device of claim 1, wherein the rotating storage medium is a bit patterned medium.

6. A method comprising:
selectively powering off a heat source of a heat assisted magnetic recording (HAMR) head while performing a timing synchronization calibration; and
exciting a writer of the HAMR head while the heat source is powered off.

7. The method of claim 6, wherein selectively powering off the heat source further comprises:
powering off the heat source when the writer of the HAMR head is aligned with a field on a bit patterned medium that does not store user data.

8. The method of claim 6, wherein selectively powering off the heat source further comprises:
powering off the heat source when the writer of the HAMR head is aligned with a timing synchronization field on a bit patterned medium.

9. The method of claim 6, wherein selectively powering off the heat source further comprises:
powering off the heat source when the writer of the HAMR head is aligned with a servo sector on a bit patterned medium.

10. The method of claim 6, wherein exciting the writer further comprises:
flowing alternating current (AC) through a write coil while the heat source is powered off.

11. A heat-assisted magnetic recording (HAMR) device comprising:
a transducer head having a heat source and a writer with a write coil;
a power controller configured to selectively power on and off the heat source independent of current flowing through the write coil based on a position of the transducer head relative to a bit patterned medium, wherein the power controller selectively powers off the heat source while allowing current to flow through the write coil when the writer is aligned with a quiet field on the bit patterned medium.

12. The HAMR device of claim 11, wherein the power controller selectively powers off the heat source independent of the current flowing through the write coil when a write pole of the transducer head is aligned with a field on the bit patterned medium that does not store user data.

13. The HAMR device claim 11, wherein the power controller selectively powers off the heat source independent of the write coil when the writer is aligned with a timing synchronization field on the bit patterned medium.

14. The HAMR device of claim 11, wherein the power controller selectively powers off the heat source independent of the current flowing through the write coil when a reader of the transducer head is aligned with a timing synchronization field on the bit patterned medium.

15. The HAMR device of claim 11, wherein the power controller selectively powers off the heat source independent of the write coil when the writer is aligned with a servo sector on the bit patterned medium.

16. The HAMR device of claim 11, wherein the power controller is further configured to flow direct current (DC) through the write coil while the heat source is powered off.

17. The HAMR device of claim 11, wherein the power controller is further configured to perform a calibration during a write mode of a storage device while the heat source is powered off.

* * * * *